(12) United States Patent
Hayakawa et al.

(10) Patent No.: US 11,569,003 B2
(45) Date of Patent: Jan. 31, 2023

(54) COMPOSITE CABLE AND COMPOSITE HARNESS

(71) Applicant: Hitachi Metals, Ltd., Tokyo (JP)

(72) Inventors: Yoshikazu Hayakawa, Tokyo (JP);
Tomoyuki Murayama, Tokyo (JP);
Hirotaka Eshima, Tokyo (JP);
Takahiro Futatsumori, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 261 days.

(21) Appl. No.: 16/803,770

(22) Filed: Feb. 27, 2020

(65) Prior Publication Data
US 2020/0286647 A1 Sep. 10, 2020

(30) Foreign Application Priority Data
Mar. 7, 2019 (JP) .............................. JP2019-041212

(51) Int. Cl.
| | | |
|---|---|---|
| H01B 7/00 | (2006.01) | |
| H01B 9/00 | (2006.01) | |
| H01B 11/02 | (2006.01) | |
| B60T 8/176 | (2006.01) | |

(52) U.S. Cl.
CPC ............ H01B 7/0045 (2013.01); B60T 8/176 (2013.01); H01B 9/003 (2013.01); H01B 11/02 (2013.01); *B60T 2270/10* (2013.01)

(58) Field of Classification Search
None
See application file for complete search history.

(56) References Cited

U.S. PATENT DOCUMENTS

| | | | | |
|---|---|---|---|---|
| 2,243,851 A | * | 6/1941 | Booth ...................... | H04B 3/32 381/94.1 |
| 4,398,058 A | * | 8/1983 | Gerth ................... | H01B 7/2825 174/107 |
| 4,467,138 A | * | 8/1984 | Brorein ................ | G02B 6/4495 385/103 |

(Continued)

FOREIGN PATENT DOCUMENTS

| | | | |
|---|---|---|---|
| CN | 105489283 A | * | 4/2016 |
| CN | 105957604 A | * | 9/2016 |

(Continued)

OTHER PUBLICATIONS

Japanese Office Action dated May 31, 2022, in corresponding Japanese Patent Application No. 2019-041212, with an English translation thereof.

(Continued)

*Primary Examiner* — Timothy J. Dole
*Assistant Examiner* — Muhammed Azam
(74) *Attorney, Agent, or Firm* — McGinn I.P. Law Group, PLLC.

(57) ABSTRACT

A composite cable is composed of a plurality of power supply wires, a plurality of signal wires, two or more of which are configured to be connected to a common terminal member, and a sheath provided to cover the plurality of power supply wires and the plurality of signal wires together. The two or more of the plurality of signal wires being configured to be connected to the common terminal member are provided adjacent to each other.

18 Claims, 3 Drawing Sheets

(56) References Cited

U.S. PATENT DOCUMENTS

| | | | | |
|---|---|---|---|---|
| 4,486,619 A * | 12/1984 | Trine | H01B 11/02 | 174/34 |
| 4,533,790 A * | 8/1985 | Johnston | H01B 11/1891 | 174/115 |
| 4,847,557 A * | 7/1989 | Saito | G01P 1/026 | 174/564 |
| 5,659,152 A * | 8/1997 | Horie | H01B 11/04 | 174/128.2 |
| 5,750,932 A * | 5/1998 | Hansson | H01B 7/0892 | 174/117 F |
| 5,770,820 A * | 6/1998 | Nelson | C08K 5/0066 | 174/121 A |
| 6,452,094 B2 * | 9/2002 | Donner | H01B 11/02 | 174/27 |
| 6,636,034 B2 * | 10/2003 | Skarpil | G01D 11/245 | 324/207.2 |
| 6,794,570 B2 * | 9/2004 | Chou | H01B 11/04 | 174/32 |
| 6,825,410 B2 * | 11/2004 | Chou | H01B 11/04 | 174/32 |
| 7,009,105 B2 * | 3/2006 | Chou | H01B 11/04 | 174/27 |
| 7,078,626 B2 * | 7/2006 | Somers | H01B 11/02 | 174/113 R |
| 7,115,815 B2 * | 10/2006 | Kenny | H01B 11/06 | 174/113 R |
| 7,453,262 B2 * | 11/2008 | Kawasaki | G01P 1/026 | 324/207.25 |
| 9,000,301 B2 | 4/2015 | Hayakawa et al. | | |
| 9,395,389 B2 * | 7/2016 | Ozaki | G01R 33/0052 | |
| 9,412,497 B2 * | 8/2016 | Hashimoto | H01B 1/026 | |
| 9,514,861 B2 * | 12/2016 | Efraimsson | H01B 7/184 | |
| 9,882,307 B2 * | 1/2018 | Sugita | H01B 7/282 | |
| 10,102,944 B2 * | 10/2018 | Kohori | H01B 3/441 | |
| 10,163,547 B2 * | 12/2018 | Hayakawa | H01B 7/1875 | |
| 10,176,908 B2 * | 1/2019 | Tanaka | H01B 3/44 | |
| 10,328,876 B2 * | 6/2019 | Koeda | H02G 3/0456 | |
| 10,414,352 B2 * | 9/2019 | Yamaguchi | H05K 9/0098 | |
| 10,418,150 B2 * | 9/2019 | Tanaka | H01B 7/0009 | |
| 10,462,928 B2 * | 10/2019 | Chen | H01B 7/08 | |
| 10,535,447 B2 * | 1/2020 | Kohori | H01B 3/441 | |
| 10,672,538 B2 * | 6/2020 | Kobayashi | H01B 9/003 | |
| 10,741,306 B2 * | 8/2020 | Kobayashi | H01B 7/041 | |
| 10,784,016 B2 * | 9/2020 | Tokumoto | H01B 7/18 | |
| 11,031,154 B2 * | 6/2021 | Hayakawa | H01B 9/003 | |
| 11,062,819 B2 * | 7/2021 | Hayakawa | B60R 16/0215 | |
| 2002/0097040 A1 * | 7/2002 | Takizawa | F16C 19/525 | 324/207.25 |
| 2004/0080314 A1 * | 4/2004 | Tsujii | G01D 11/245 | 73/431 |
| 2006/0021786 A1 * | 2/2006 | Fetterolf | H01B 9/02 | 174/113 R |
| 2011/0174518 A1 * | 7/2011 | Iwasaki | H01B 3/302 | 174/116 |
| 2011/0200289 A1 * | 8/2011 | Sorimachi | H01B 7/041 | 385/101 |
| 2011/0278043 A1 * | 11/2011 | Ueda | H01B 7/1895 | 174/115 |
| 2013/0266280 A1 * | 10/2013 | Sakabe | H01R 3/00 | 385/101 |
| 2013/0277087 A1 * | 10/2013 | Hayakawa | B60R 16/0215 | 174/107 |
| 2015/0083482 A1 * | 3/2015 | Eshima | H01B 7/182 | 174/393 |
| 2015/0129277 A1 * | 5/2015 | Siripurapu | H01B 3/441 | 174/103 |
| 2015/0165988 A1 * | 6/2015 | Hayakawa | H01B 7/0045 | 188/158 |
| 2015/0200040 A1 * | 7/2015 | Pon | H01B 11/00 | 174/103 |
| 2016/0176369 A1 * | 6/2016 | Ito | H01B 9/006 | 174/72 A |
| 2016/0300641 A1 * | 10/2016 | Mayama | H01B 13/24 | |
| 2017/0253198 A1 * | 9/2017 | Hayakawa | H01B 7/0045 | |
| 2017/0263353 A1 * | 9/2017 | Hayakawa | H01B 3/002 | |
| 2017/0287590 A1 * | 10/2017 | Hayakawa | B60R 16/0231 | |
| 2017/0355883 A1 * | 12/2017 | Hayakawa | B60R 16/0207 | |
| 2018/0068760 A1 * | 3/2018 | Okuda | H01B 7/0009 | |
| 2018/0151272 A1 * | 5/2018 | Watanabe | A61B 1/00114 | |
| 2018/0166184 A1 * | 6/2018 | Hayakawa | H01B 7/285 | |
| 2018/0281706 A1 * | 10/2018 | Kobayashi | H01B 11/04 | |
| 2019/0248308 A1 * | 8/2019 | Hayakawa | B60R 16/03 | |
| 2019/0344733 A1 * | 11/2019 | Toyoshima | H02G 3/0406 | |
| 2020/0013523 A1 * | 1/2020 | Eshima | H01B 7/0045 | |
| 2020/0013524 A1 * | 1/2020 | Eshima | H01B 7/1895 | |
| 2020/0168358 A1 * | 5/2020 | Hayakawa | H01B 3/441 | |
| 2020/0185128 A1 * | 6/2020 | Hayakawa | H01B 9/003 | |
| 2020/0262364 A1 * | 8/2020 | Eshima | B60T 7/085 | |
| 2020/0286647 A1 * | 9/2020 | Hayakawa | H01B 9/003 | |
| 2020/0318994 A1 * | 10/2020 | Hayakawa | H01B 7/02 | |
| 2021/0210251 A1 * | 7/2021 | Hayakawa | B60R 16/0207 | |
| 2021/0263249 A1 * | 8/2021 | Ishikawa | H01B 11/22 | |
| 2022/0102023 A1 * | 3/2022 | Hayakawa | H01B 7/0009 | |

FOREIGN PATENT DOCUMENTS

| | | | | |
|---|---|---|---|---|
| CN | 205645389 U | * | 10/2016 | B60R 16/0215 |
| CN | 106098181 A | * | 11/2016 | |
| CN | 205828002 U | * | 12/2016 | B60R 16/0215 |
| CN | 107112076 A | * | 8/2017 | H01B 1/026 |
| CN | 108550421 A | * | 9/2018 | H01B 5/08 |
| CN | 109102937 A | * | 12/2018 | H01B 13/22 |
| CN | 109841314 A | * | 6/2019 | B60R 16/0215 |
| CN | 110310771 A | * | 10/2019 | C08L 27/06 |
| CN | 112420251 A | * | 2/2021 | |
| CN | 112837852 A | * | 5/2021 | |
| EP | 2761705 B1 | * | 11/2019 | B60R 16/0215 |
| GB | 2479724 A | * | 10/2011 | H01B 7/045 |
| JP | 2005-285738 A | | 10/2005 | |
| JP | 2006-278207 A | | 10/2006 | |
| JP | 5541331 B2 | | 7/2014 | |
| JP | 2017-224434 A | | 12/2014 | |
| JP | 2016110836 A | * | 6/2016 | |
| JP | 2016195071 A | * | 11/2016 | |
| JP | 2017131054 A | * | 7/2017 | B60R 16/0207 |
| JP | 2018137243 A | * | 8/2018 | |
| JP | 2018-174442 A | | 11/2018 | |
| JP | 2020-047450 A | | 3/2020 | |
| JP | 202047450 | * | 3/2020 | |
| KR | 20150140512 A | * | 12/2015 | |
| WO | WO-2006071905 A1 | * | 7/2006 | H01B 7/20 |
| WO | WO-2017109939 A1 | * | 6/2017 | B60R 16/0207 |
| WO | WO-2017209298 A1 | * | 12/2017 | B60R 16/0207 |
| WO | WO-2018198475 A1 | * | 11/2018 | B60R 16/023 |

OTHER PUBLICATIONS

Japanese Office Action dated Nov. 8, 2022, in corresponding Japanese Patent Application No. 2019-041212, with an English translation thereof.

* cited by examiner

COMPOSITE CABLE AND COMPOSITE HARNESS

CROSS-REFERENCE TO RELATED APPLICATIONS

The present invention is based on Japanese Patent Application No. 2019-41212 filed on Mar. 7, 2019, the entire contents of which are incorporated herein by reference.

BACKGROUND OF THE INVENTION

1. Field of the Invention

The present invention relates to a composite cable and a composite harness.

2. Description of the Related Art

Conventionally, there has been known a composite cable with a power supply wire and a signal wire being covered together with a sheath therein. As an example, there is known a composite cable including one signal wire, which is connected to an ABS (Anti-lock Brake System) sensor for measuring the rotation speed of a wheel of a vehicle, and one pair of power supply wires, which are connected to an electric parking brake device for braking the rotation of the wheel after stopping the vehicle (e.g., see Japanese Patent No. 5541331 below).

[Patent Document 1] Japanese Patent No. 5541331

SUMMARY OF THE INVENTION

Now, in recent years, from the point of view of a fail-safe, the vehicles have actively been provided with a redundancy, and sensors therefor, such as the ABS sensor and the like, have also been desired to be provided with a redundancy. For that reason, a composite cable and a composite harness that are configured to be compatible with the redundancies have been required.

In view of the foregoing, an object of the present invention is to provide a composite cable and a composite harness that can be configured with a redundancy.

For the purpose of solving the above problems, the present invention provides a composite cable, comprising: a plurality of power supply wires; a plurality of signal wires, two or more of which are configured to be connected to a common terminal member; and a sheath provided to cover the plurality of power supply wires and the plurality of signal wires together, wherein the two or more of the plurality of signal wires being configured to be connected to the common terminal member are provided adjacent to each other.

In addition, for the purpose of solving the above problems, the present invention provides a composite harness, comprising: a composite cable composed of a plurality of power supply wires, a plurality of signal wires, and a sheath provided to cover the plurality of power supply wires and the plurality of signal wires together; and a common terminal member provided to be connected to one end portions of two or more of the plurality of signal wires, wherein the two or more of the plurality of signal wires being connected to the common terminal member are provided adjacent to each other.

Points of the Invention

According to the present invention, it is possible to provide the composite cable and the composite harness that can be configured with a redundancy.

DETAILED DESCRIPTION OF THE PREFERRED EMBODIMENTS

Embodiments

Figure 1A:
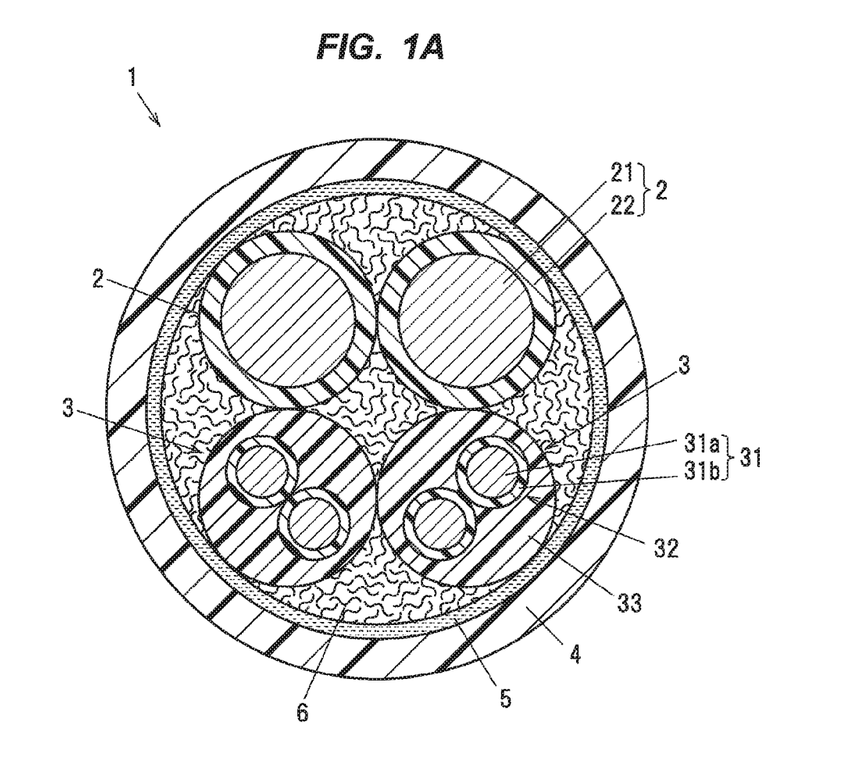
FIG. 1A is a cross-sectional view perpendicular to a longitudinal direction of a composite cable according to one embodiment of the present invention.

Hereinafter, embodiments of the present invention will be described with reference to the accompanying drawings. FIG. 1A is a cross-sectional view perpendicular to a longitudinal direction of a composite cable 1 according to the present embodiment, and FIG. 1B is a schematic configuration diagram of a composite harness 10 according to the present embodiment.

(Composite Cable)

Figure 1B:
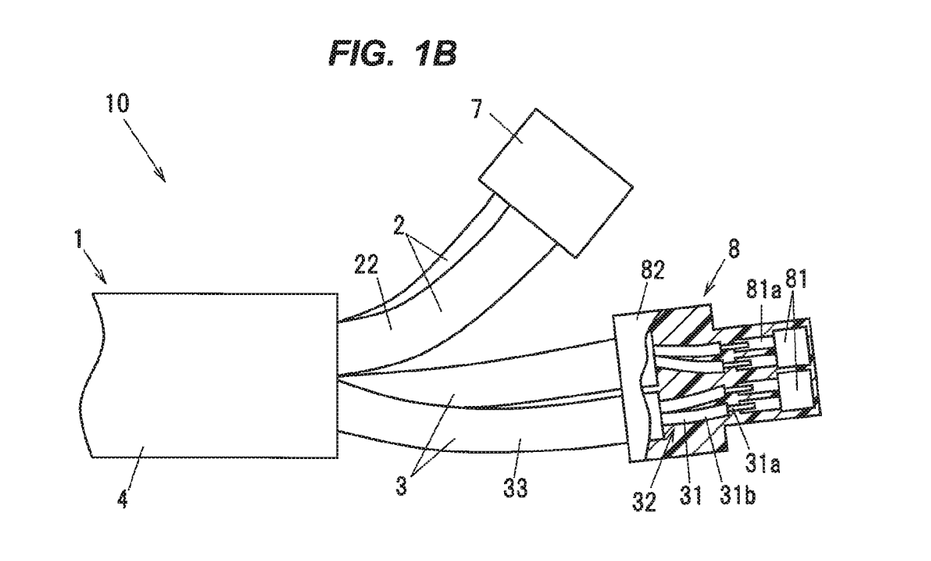
FIG. 1B is a schematic configuration diagram of a composite harness according to one embodiment of the present invention.

As shown in FIGS. 1A and 1B, the composite cable 1 includes two power supply wires 2 and 2, two signal wires 3 and 3, and a sheath 4 provided to cover the two power supply wires 2 and 2 and the two signal wires 3 and 3 together.

Each of the two power supply wires 2 and 2 includes a first conductor 21, and a first electrical insulating member 22, which is provided over an outer periphery of the first conductor 21. Each of the first conductors 21 and 21 of the two power supply wires 2 and 2 is made of a composite stranded wire produced by using a plurality of parent strands each being composed of a plurality of wires made of a copper or the like being stranded together, and further stranding that plurality of parent strands together. The plurality of parent strands constituting the first conductors 21 and 21 of the two power supply wires 2 and 2 are each constituted by bunched stranding of the plurality of wires together, and the first conductors 21 and 21 of the two power supply wires 2 and 2 are each constituted by concentric stranding of the plurality of parent strands together.

By using the composite stranded wires as the first conductors 21 and 21 of the two power supply wires 2 and 2, it is possible to make the bendability (flexibility) of the two power supply wires 2 and 2 high, and thereby achieve the composite cable 1 that is easy to route. In addition, by using the composite stranded wires as the first conductors 21 and 21 of the two power supply wires 2 and 2, it is possible to minimize a difference in rigidity between the two power supply wires 2 and 2 and the two signal wires 3 and 3 which will be described later, and it is therefore possible to, when laying the two power supply wires 2 and 2 and the two signal wires 3 and 3 together, suppress the occurrence of such a permanent bending thereof (hereinafter, referred to as simply a permanent bending) as to cause the two power supply wires 2 and 2 and the two signal wires 3 and 3 to become naturally kinked and meander.

In the present embodiment, the two power supply wires 2 and 2 and the two signal wires 3 and 3 are not alternately arranged in a circumferential direction of the composite cable 1, which will be described in detail later, but the two power supply wires 2 and 2 are arranged adjacent to each other in the circumferential direction of the composite cable 1, while the two signal wires 3 and 3 are also arranged adjacent to each other in the circumferential direction of the composite cable 1. In the above configuration of the two power supply wires 2 and 2 and the two signal wires 3 and 3, in particular, if the difference in rigidity between the two power supply wires 2 and 2 and the two signal wires 3 and 3 is too large, there is concern that, when the two power supply wires 2 and 2 and the two signal wires 3 and 3 are laid together, a large permanent bending thereof may occur. By configuring the first conductors 21 and 21 of the two power supply wires 2 and 2 by the composite stranding as in the present embodiment, it is possible to make the rigidity of the two power supply wires 2 and 2 and the rigidity of the two signal wires 3 and 3 substantially equal to each other, and it is therefore possible to, when laying the two power supply wires 2 and 2 and the two signal wires 3 and 3 together, suppress the occurrence of a permanent bending thereof, and thereby achieve the composite cable 1 that is straight in shape and easily bendable in any direction.

As the wires to be used in the first conductors 21 and 21 of the two power supply wires 2 and 2, the wires having an outer diameter of not smaller than 0.08 mm and not larger than 0.16 mm may be used. This is because if the outer diameters of the wires are smaller than 0.08 mm, a wire break in the wires is highly likely to occur during the composite cable 1 bending or the like, or if the outer diameters of the wires exceed 0.16 mm, the first conductors 21 and 21 made of those wires become hard and the two power supply wires 2 and 2 composed of the first conductors 21 and 21 become high in the rigidity, therefore leading to concern that the composite cable 1 may become low in routing capability, or concern that the difference in the rigidity between the two power supply wires 2 and 2 and the two signal wires 3 and 3 may become large, causing the two power supply wires 2 and 2 and the two signal wires 3 and 3 to be permanently bent when laid together.

The first electrical insulating members 22 and 22 of the two power supply wires 2 and 2 are made of, e.g., an XLPE (crosslinked polyethylene), an ETFE (tetrafluoroethylene-ethylene copolymer), or the like.

In the present embodiment, the two power supply wires 2 and 2 are the power supply wires dedicated to an electric parking brake, which are configured to be connected to an electric parking brake device (not shown) for braking a rotation of a wheel after vehicle stopping. The two power supply wires 2 and 2 have no shield conductor configured for noise suppression, because the time taken to supply electric power to the electric parking brake device (not shown) is short, and in addition the electric power supply is performed during the vehicle stopping during which an ABS sensor, which will be described later, is not used.

The composite cable 1 includes the two power supply wires 2 and 2 therein. The two power supply wires 2 and 2 are configured to be connected to a connector 7, which is configured for connecting to the electric parking brake device (not shown). That is, the two power supply wires 2 and 2 are configured to be connected to one common terminal member.

The two signal wires 3 and 3 are each configured to include a twisted wire pair 32 comprising one pair of insulated electric wires 31 and 31 being twisted together, and an internal sheath 33 for coating together the one pair of insulated electric wires 31 and 31 of the twisted wire pair 32. The one pairs of insulated electric wires 31 of the twisted wire pairs 32 and 32 of the two signal wires 3 and 3 are each configured to include a second conductor 31a comprising a plurality of wires made of a copper or the like being stranded together, and a second electrical insulating member 31b for coating an outer periphery of the second conductor 31a. The second electrical insulating members 31b of the insulated electric wires 31 are made of, e.g., an XLPE (crosslinked polyethylene), an ETFE (tetrafluoroethylene-ethylene copolymer), or the like. In the present embodiment, the internal sheaths 33 and 33 of the two signal wires 3 and 3 are configured with an urethane resin.

The composite cable 1 is equipped with the two signal wires 3 and 3 therein. The two signal wires 3 and 3 are configured to be connected to a sensor section 8 of an ABS sensor for measuring a rotation speed of a wheel, and the two signal wires 3 and 3 are configured to be used in a common use application for the purpose of providing a redundancy. That is, the two signal wires 3 and 3 are configured to be connected to one common terminal member. The two signal wires 3 and 3 being used have the same structures.

In the composite cable 1, the two power supply wires 2 and 2 and the two signal wires 3 and 3 are laid together, and a binder tape 5 is helically wrapped around a periphery of the two power supply wires 2 and 2 and the two signal wires 3 and 3 being laid together. The outer diameters of the two power supply wires 2 and the two signal wires 3 may be substantially equal to each other in order to suppress the occurrence of a permanent bending thereof when the two power supply wires 2 and 2 and the two signal wires 3 and 3 are laid together. In the present embodiment, the outer diameters of the two power supply wires 2 and 2 are not smaller than 3 mm and not larger than 4 mm, while the outer diameters of the two signal wires 3 and 3 are not smaller than 4 mm and not larger than 5 mm. The outer diameters of the two power supply wires 2 and 2 are preferably not lower than 60% and not higher than 140%, more preferably not lower than 80% and not higher than 120% of the outer diameters of the two signal wires 3 and 3.

The binder tape 5 is made of, e.g., a paper, a nonwoven fabric cloth, a resin tape, or the like. The binder tape 5 both serves to suppress the occurrence of an unlaying of the two power supply wires 2 and 2 and the two signal wires 3 and 3 being laid together, and serves as a separator to suppress the occurrence of a welding between the sheath 4 and the internal sheaths 33 and 33 of the two signal wires 3 and 3 during molding the sheath 4, and thereby facilitate separation of the signal wires 3 during termination. Further, the binder tape 5 may be configured to include a metal layer. In this case, the metal layer of the binder tape 5 serves as a shield, to be able to prevent external noise from being mixed into the two signal wires 3 and 3.

A filling member 6 is provided between the two power supply wires 2 and 2, the two signal wires 3 and 3, and the binder tape 5. As the filling member 6, a threadlike (fibrous) member formed to extend in the longitudinal direction of the composite cable 1 can be used. The filling member 6 is arranged in such a manner as to impregnate the spaces between the two power supply wires 2 and 2, the two signal wires 3 and 3, and the binder tape 5. This makes it possible to make the cross-sectional shape of the composite cable 1 closer to a circular shape. The filling member 6 is laid together with the two power supply wires 2 and 2 and the two signal wires 3 and 3, and the binder tape 5 is helically wrapped around the periphery of the filling member 6, the two power supply wires 2 and 2 and the two signal wires 3 and 3 being laid together. As the filling member 6, e.g., a fibrous material such as a polypropylene yarn, a staple fiber yarn (a rayon staple fiber), an aramid fiber, a nylon fiber, a fiber-based plastic or the like, a paper, or a cotton yarn can be used.

The sheath 4 is provided on an outer periphery of the binder tape 5. The sheath 4 is made of, e.g., an urethane resin.

In the composite cable 1 according to the present embodiment, when there are a plurality of the signal wires 3, two or more of the plurality of the signal wires 3, which are connected to a common terminal member, are provided adjacent to each other. In the present embodiment, since the two signal wires 3 and 3 are connected to the sensor section 8 configured as the common terminal member, these two signal wires 3 and 3 are provided adjacent to each other in the circumferential direction of the composite cable 1 within the binder tape 5.

Note that, herein, "being provided adjacent to each other" means being arranged side by side when laid together. That is, when the two signal wires 3 and 3 and the other electric wires (herein, the two power supply wires 2 and 2) are helically laid together, and when the two signal wires 3 and 3 are arranged side by side with the other electric wires (herein, the two power supply wires 2 and 2) being not interposed therebetween in the circumferential direction around a center around which the two signal wires 3 and 3 and the other electric wires (herein, the two power supply wires 2 and 2) are helically laid together, the two signal wires 3 and 3 are "being provided adjacent to each other". Also, when only the two signal wires 3 and 3 are laid together, it can be said that the two signal wires 3 and 3 are "being provided adjacent to each other".

In the present embodiment, the two signal wires 3 and 3 are provided to remain in contact with each other (the two signal wires 3 and 3 are provided in such a manner that their outer surfaces remain contiguous to each other). Note that, for example, a member other than signal wires, such as the filling member 6, may be interposed between the two signal wires 3 and 3. It should be noted, however, that, in this case, it is necessary and time consuming to remove the filling member 6 and the like interposed between the two signal wires 3 and 3 during the termination.

In addition, in the composite cable 1, when there are a plurality of the power supply wires 2, two or more of the plurality of the power supply wires 2, which are connected to a common terminal member, are provided adjacent to each other. In the present embodiment, since the two power supply wires 2 and 2 are connected to the connector 7 configured as the common terminal member, these two power supply wires 2 and 2 are provided adjacent to each other in the circumferential direction of the composite cable 1 within the binder tape 5. The two power supply wires 2 and 2 are provided to remain in contact with each other (the two power supply wires 2 and 2 are provided in such a manner that their outer surfaces remain contiguous to each other).

In a general composite cable, its two power supply wires 2 and 2 and its two signal wires 3 and 3 are generally alternately arranged in the circumferential direction of that cable in order to make the cross-sectional shape close to a circular shape and make that cable easy to bend in any direction (in the cross-sectional view, the two power supply wires 2 and 2 and the two signal wires 3 and 3 are generally arranged at diagonal positions, respectively, of a square). In this case, however, during the termination, the two power supply wires 2 and 2 and the two signal wires 3 and 3 exposed from the sheath 4 are required to be pulled out in such a manner as to intersect with each other, so the exposure length to which the two power supply wires 2 and 2 and the two signal wires 3 and 3 are exposed from the sheath 4 may be required to be made long, or the work to form a later described resin molded body 82 over one end portions of the two signal wires 3 and 3 may become difficult to perform. As in the composite cable 1 according to the present embodiment, by employing such a configuration that the electric wires having the same connection destination are arranged adjacent to each other (the two power supply wires 2 and 2 having the same connection destination are arranged adjacent to each other while the two signal wires 3 and 3 having the same connection destination are arranged adjacent to each other), it is possible to easily pull out (separate) the electric wires having the same connection destination together. This makes it possible to shorten the exposure length to which the two power supply wires 2 and 2 and the two signal wires 3 and 3 are exposed from the sheath 4, and also facilitates the termination work such as the work to form the resin molded body 82.

(Composite Harness)

The composite harness 10 according to the present embodiment is configured to include the composite cable 1 according to the present embodiment, and a terminal member (herein, the sensor section 8), which is provided to be connected to one end portions of two or more of a plurality of signal wires 3 (herein, the two signal wires 3 and 3). Note that the terminal member to be provided at the one end portions of the two signal wires 3 and 3 is not limited to the sensor section 8, but may be, for example, a connector or the like, which is configured to be connected to another member (another sensor section or the like) provided separately from the composite harness 10.

As described above, in the present embodiment, the two signal wires 3 and 3 are connected to the one sensor section 8 for the purpose of providing a redundancy. The sensor section 8 is configured to include two magnetic detecting elements 81, and the one pairs of second conductors 31a of the two signal wires 3 and 3 are electrically connected to four corresponding lead wires 81a of the two magnetic detecting elements 81 respectively by soldering, or welding, or the like.

In addition, the sensor section 8 is configured to include a resin molded body 82. The resin molded body 82 is formed in such a manner as to cover the end portions of the internal sheaths 33 and 33 of the two signal wires 3 and 3, the one pairs of insulated electric wires 31 of the twisted wire pairs 32 and 32 of the two signal wires 3 and 3 being extended out from the end portions of the internal sheaths 33 and 33 of the two signal wires 3 and 3, and the two magnetic detecting elements 81. By employing such a configuration that the two magnetic detection elements 81 are covered together with the resin molded body 82, it is possible to enhance the handleability even when providing the redundancy. In the present embodiment, the resin molded body 82 is made of an urethane resin. The internal sheaths 33 and 33 of the two signal wires 3 and 3 and the resin molded body 82 are welded together and made integral by the heat during molding the resin molded body 82, thereby suppressing the occurrence of ingress of moisture into the sensor section 8. Note that the sensor section 8 is also called a sensor head.

If the two signal wires 3 and 3 are in contact with each other at their portions extended out from the resin molded body 82, the internal sheaths 33 and 33 of the two signal wires 3 and 3 at the contacting portions thereof are not sufficiently welded to the resin molded body 82, leading to concern that moisture may intrude into the sensor section 8. For the purpose of avoiding this, in the present embodiment, the two signal wires 3 and 3 are configured to be spaced apart from each other at their portions extended out from the resin molded body 82 and thereby allow the resin molded body 82 to penetrate into the space between the two signal wires 3 and 3. By configuring the two signal wires 3 and 3 in the above manner in the sensor section 8, the surfaces of the two signal wires 3 and 3 (the outer surfaces of the internal sheaths 33 and 33 of the two signal wires 3 and 3) are welded to the resin mold 8 over their entire circumferences, so it is possible to further suppress the occurrence of the ingress of moisture into the sensor section 8.

Although not shown, a connector, which is configured for connecting to a control device, is provided at the opposite end portions of the two signal wires 3 and 3 to the sensor section 8.

Further, in the composite harness 10, the two power supply wires 2 and 2 are connected to the common connector 7. By using the composite cable 1 with the two power supply wires 2 and 2 being arranged adjacent to each other therein and with the two signal wires 3 and 3 being arranged adjacent to each other therein, the separation between the two power supply wires 2 and 2 and the two signal wires 3 and 3 is easy to perform, thereby facilitating the termination work.

(Actions and Advantageous Effects of the Embodiment)

In the composite cable 1 according to the embodiment described above, when there are a plurality of the signal wires 3, the two signal wires 3 and 3 connected to the common terminal member (herein, the sensor section 8) are provided adjacent to each other. The use of the plurality of the signal wires 3 enables providing a redundancy, and furthermore, by arranging the two signal wires 3 and 3 of the same connection destination (the same use application) used in providing the redundancy adjacent to each other, the separation of the two signal wires 3 and 3 can easily be performed during the termination, thereby facilitating the termination work such as the work to mold the resin molded body 82 or the work to connect the two signal wires 3 and 3 to a connector, or the like.

Other Embodiments

Figure 2A:
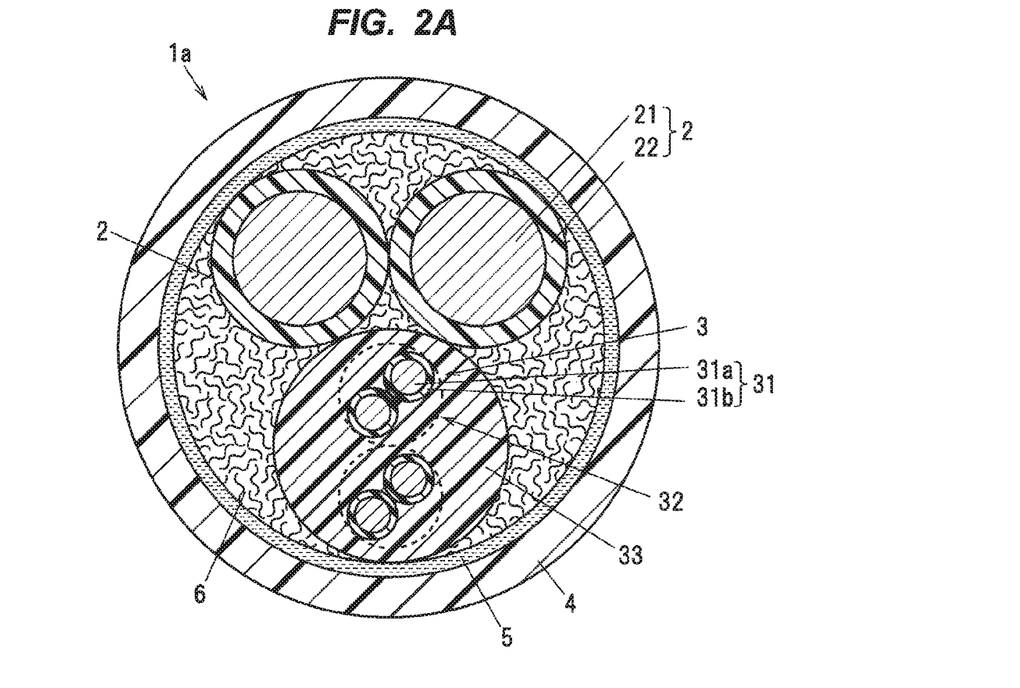
FIG. 2A is a cross-sectional view perpendicular to a longitudinal direction of a composite cable according to another embodiment of the present invention.

A composite cable 1a shown in FIG. 2A is configured in such a manner that, in the composite cable 1 of FIG. 1A, the two signal wires 3 and 3 are each configured with a twisted wire pair 32 composed of one pair of insulated electric wires 31 and 31 being twisted together, with the twisted wire pairs 32 and 32 of the two signal wires 3 and 3 being further twisted around each other, with an internal sheath 33 being provided to cover together the twisted wire pairs 32 and 32 of the two signal wires 3 and 3 being twisted around each other. As in the composite cable 1a, the two signal wires 3 and 3 may be twisted around each other, and in addition, the two signal wires 3 and 3 may be covered together with the internal sheath 33.

Figure 2B:
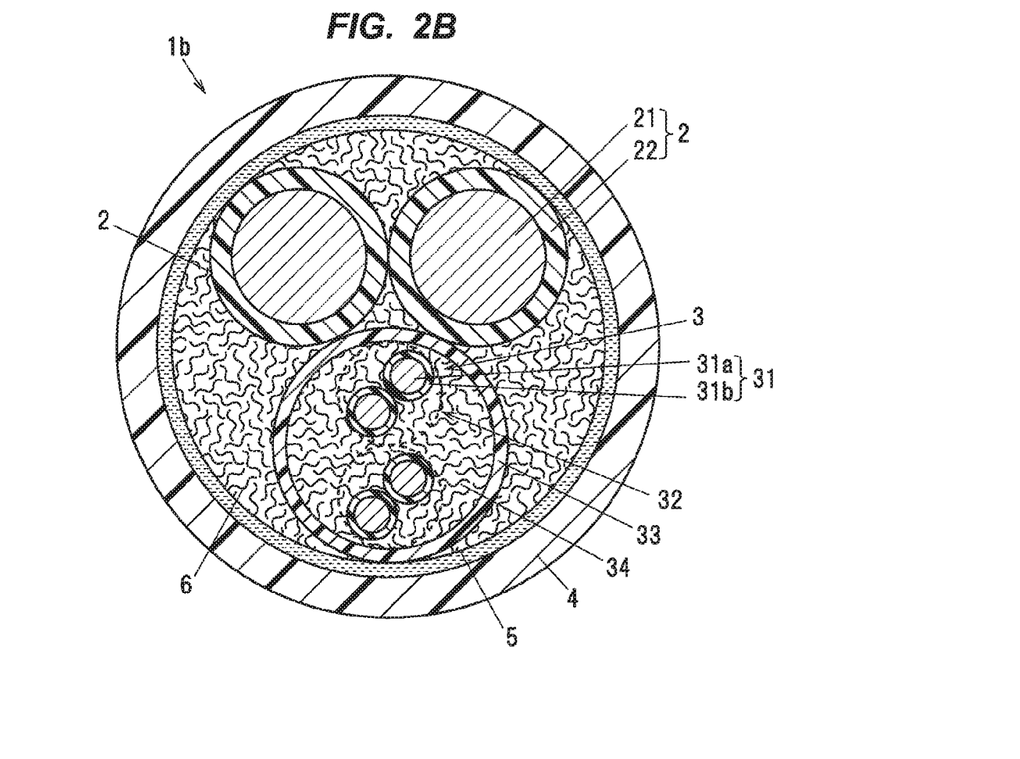
FIG. 2B is a cross-sectional view perpendicular to a longitudinal direction of a composite cable according to another embodiment of the present invention.

A composite cable 1b shown in FIG. 2B is configured in such a manner that the two signal wires 3 and 3 are each configured with a twisted wire pair 32 composed of one pair of insulated electric wires 31 and 31 being twisted together, with the twisted wire pairs 32 and 32 of the two signal wires 3 and 3 and an inner filling member 34 being twisted together, with an internal sheath 33 being provided over a periphery of the twisted wire pairs 32 and 32 of the two signal wires 3 and 3 and the inner filling member 34 being twisted together. As in the case of the composite cable 1b, by employing such a configuration that the inner filling member 34 is further being provided within the internal sheath 33, during molding the internal sheath 33, the resin constituting the internal sheath 33 is prevented from ingress into the space between the twisted wire pairs 32 and 32 of the two signal wires 3 and 3, so it is possible to easily separate the twisted wire pairs 32 and 32 of the two signal wires 3 and 3 from the internal sheath 33, and thereby further enhance the termination workability. As the inner filling member 34, the same member as the filling member 6 described above can be used. Note that a binder tape may be wrapped around a periphery of the twisted wire pairs 32 and 32 of the two signal wires 3 and 3 and the inner filling member 34 being twisted together, and that the internal sheath 33 may be provided on a periphery of that binder tape.

In the composite cables 1a and 1b, since the twisted wire pairs 32 and 32 of the two signal wires 3 and 3 are arranged close to each other, it is more desirable to make the twist pitches of the twisted wire pairs 32 and 32 of the two signal wires 3 and 3 different from each other and thereby suppress a crosstalk between the two signal wires 3 and 3. Further, by making the twist pitches of the twisted wire pairs 32 and 32 of the two signal wires 3 and 3 different from each other, a difference occurs in the bending lives of the twisted wire pairs 32 and 32 of the two signal wires 3 and 3. Thus, for example, the following use method can also be considered: the twisted wire pair 32 having a narrow twist pitch (a long bending life) is mainly used, and when a wire break occurs in the one pair of insulated electric wires 31 constituting the twisted wire pair 32 having a wide twist pitch (a short bending life), a replacement of the composite harness 10 is prompted.

Figure 3A:
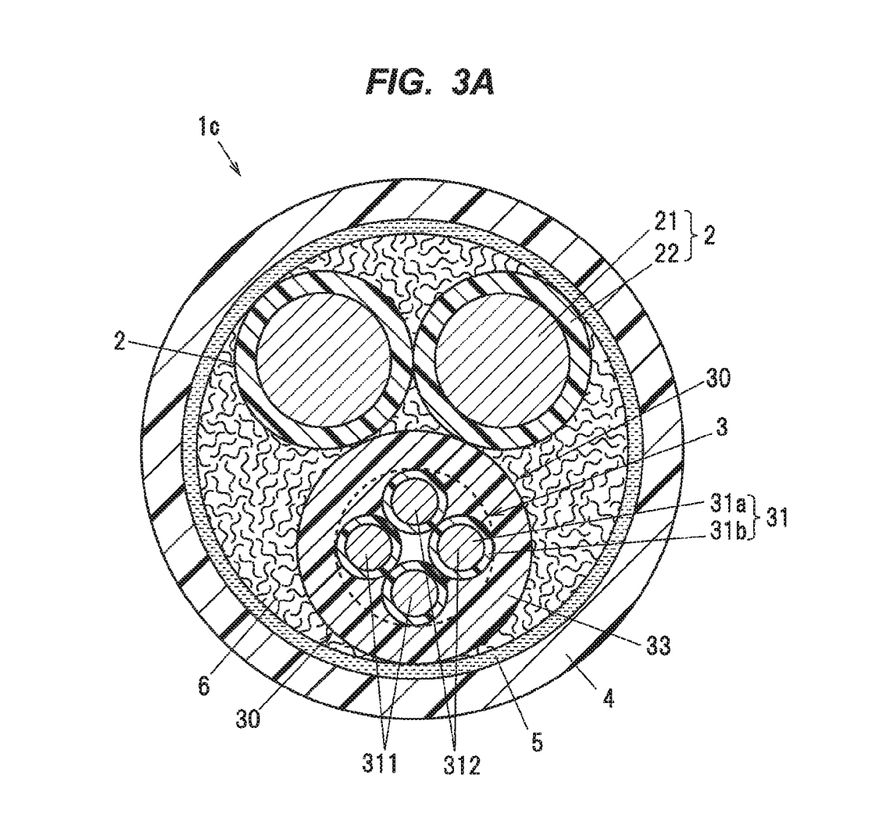
FIG. 3A is a cross-sectional view perpendicular to a longitudinal direction of a composite cable according to another embodiment of the present invention.

A composite cable 1c shown in FIG. 3A is configured in such a manner that the two signal wires 3 and 3 each have a one pair of insulated electric wires 31, with two pairs (four) of the insulated electric wires 31 constituting the two signal wires 3 and 3 being laid together to provide an aggregate with the two pairs (four) of the insulated electric wires 31 constituting the two signal wires 3 and 3 being laid together therein, with an internal sheath 33 being provided in such a manner as to coat a whole of the aggregate. That is, in the composite cable 1c, the internal sheath 33 is formed in such a manner as to coat a whole of the four insulated electric wires 31 being laid together. Hereinafter, the one pair of insulated electric wires 31 constituting one of the two signal wires 3 and 3 are referred to as the first one pair of insulated electric wires 311, while the one pair of insulated electric wires 31 constituting the other of the two signal wires 3 and 3 are referred to as the second one pair of insulated electric wires 312. In addition, a structure with the first one pair of insulated electric wires 311 and the second one pair of insulated electric wires 312 being twisted together and formed with the internal sheath 33 therearound is referred to as a signal wire composite body 30. The two first insulated electric wires 311 are connected to one of the two magnetic detecting elements 81, while the two second insulated electric wires 312 are connected to the other of the two magnetic detecting elements 81.

Figure 3B:
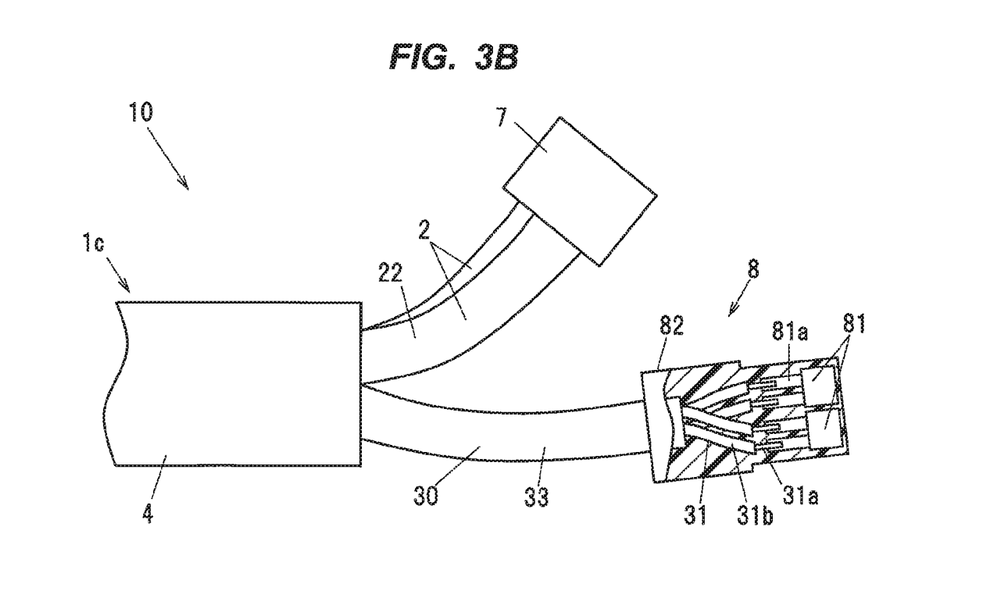
FIG. 3B is a schematic configuration diagram of a composite harness using the composite cable of FIG. 3A.

In the composite cable 1c, the two first insulated electric wires 311 are arranged adjacent to each other in the circumferential direction of the signal wire composite body 30, while the two second insulated electric wires 312 are arranged adjacent to each other in the circumferential direction of the signal wire composite body 30. This makes it possible to easily separate the two first insulated electric wires 311 and the two second insulated electric wires 312 from each other during the termination, and thereby facilitate the termination work. Further, as shown in FIG. 3B, in the composite harness 10 using the composite cable 1c, since the width required to weld the resin molded body 82 and the composite cable 1c together can be narrowed, it is possible to reduce the size of the sensor section 8 as compared to FIG. 1B.

SUMMARY OF THE EMBODIMENTS

Next, the technical ideas grasped from the above-described embodiments will be described with the aid of the reference characters and the like in the embodiments. It should be noted, however, that each of the reference characters and the like in the following descriptions is not to be construed as limiting the elements in the appended claims to the members and the like specifically shown in the embodiments.

[1] A composite cable (1), comprising: a plurality of power supply wires (2); a plurality of signal wires (3), two or more of which are configured to be connected to a common terminal member (8); and a sheath (4) provided to cover the plurality of power supply wires (2) and the plurality of signal wires (3) together, wherein the two or more of the plurality of signal wires (3) being configured to be connected to the common terminal member (8) are provided adjacent to each other.

[2] The composite cable (1) according to [1] above, wherein the two or more of the plurality of signal wires (3) being configured to be connected to the common terminal member (8) are provided to remain in contact with each other.

[3] The composite cable (1) according to [1] or [2] above, wherein the plurality of signal wires (3) include two signal wires (3), which are configured to be connected to a sensor section (8) of an ABS sensor for measuring a rotation speed of a wheel, wherein the two signal wires (3) being configured to be connected to the sensor section (8) of the ABS sensor are provided adjacent to each other.

[4] The composite cable (1) according to any one of [1] to [3] above, wherein two or more of the plurality of power supply wires (2), which are configured to be connected to an other common terminal member (7), are provided adjacent to each other.

[5] The composite cable (1) according to [4] above, wherein the plurality of power supply wires (2) include two power supply wires (2), which are configured to be connected to an electric parking brake device for braking a rotation of a wheel after vehicle stopping, wherein the two power supply wires (2) being configured to be connected to the electric parking brake device are provided adjacent to each other.

[6] The composite cable (1) according to any one of [1] to [5] above, wherein the plurality of signal wires (3) are each configured to include a twisted wire pair (32) comprising one pair of insulated electric wires (31) being twisted together, and wherein an internal sheath (33) for coating together the one pair of insulated electric wires (31) of the twisted wire pair (32).

[7] The composite cable (1a, 1b) according to any one of [1] to [5] above, wherein the plurality of signal wires (3) are each configured to include a twisted wire pair (32) comprising one pair of insulated electric wires (31) being twisted together, and wherein an internal sheath (33) is provided to cover together the twisted wire pairs (32) of the plurality of signal wires (3) being twisted around each other.

[8] The composite cable (1c) according to any one of [1] to [5], wherein the plurality of signal wires (3) are each configured to include one pair of insulated electric wires (31), with the one pairs of insulated electric wires (31) of the plurality of signal wires (3) being laid together to provide an aggregate, and wherein an internal sheath (33) is provided to cover a whole of the aggregate.

[9] A composite harness (10), comprising: a composite cable (1) composed of a plurality of power supply wires (2), a plurality of signal wires (3), and a sheath (4) provided to cover the plurality of power supply wires (2) and the plurality of signal wires (3) together; and a common terminal member (8) provided to be connected to one end portions of two or more of the plurality of signal wires (3), wherein the two or more of the plurality of signal wires (3) being connected to the common terminal member (8) are provided adjacent to each other.

Although the embodiments of the present invention have been described above, the embodiments described above are not to be construed as limiting the inventions according to the appended claims. In addition, it should be noted that not all the combinations of the features described in the embodiments are essential to the means for solving the problems of the invention.

The present invention can be appropriately modified and implemented without departing from the spirit thereof. For example, although, in the above-described embodiments, the case where the two power supply wires 2 and 2 are the power supply wires dedicated to the electric parking brake has been described, the two power supply wires 2 and 2 are not limited to the above power supply wires dedicated to the electric parking brake, but the two power supply wires 2 and 2 may be, for example, power supply wires configured to be used for an electromechanical brake (EMB), or the like. In addition, although, in the above-described embodiments, the case where the two signal wires 3 and 3 are the signal wires dedicated to the ABS sensor has been described, the two signal wires 3 and 3 are not limited to the above signal wires dedicated to the ABS sensor, but the two signal wires 3 and 3 may be, for example, signal wires configured to be used for an air pressure sensor.

In addition, although, in the above embodiments, the case where the two power supply wires 2 and 2 and the two signal wires 3 and 3 are provided in the composite cable 1 has been described, the number of the power supply wires 2 and the number of the signal wires 3 are not limited to the above numbers. For example, when two of the signal wires 3 configured to be used for the ABS sensor and two of the signal wires 3 configured to be used for the air pressure sensor are included in the composite cable 1, the two signal wires 3 and 3 configured to be used for the ABS sensor may be configured to be provided adjacent to each other, while the two signal wires 3 and 3 configured to be used for the air pressure sensor may be configured to be provided adjacent to each other.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A composite cable, comprising:
a plurality of power supply wires;
an aggregate comprising a first signal wire comprising two first insulated electric wires and a second signal wire comprising two second insulated electric wires, the first signal wire and the second signal wire being laid together; and
a sheath provided to cover the plurality of power supply wires and the aggregate together,
wherein the two first insulated electric wires and the two second insulated electric wires are arranged side-by-side in a circumferential direction of the aggregate,
wherein the two first insulated electric wires are arranged to be adjacent to each other in the circumferential direction of the aggregate and are connected to one of two magnetic detecting elements, and
wherein the two second insulated electric wires are arranged to be adjacent to each other in the circumferential direction of the aggregate and are, connected to an other of the two magnetic detecting elements.

2. The composite cable according to claim 1, wherein the two first insulated electric wires remain in contact with each other and the two second insulated electric wires remain in contact with each other, and
wherein one of the two first insulated electric wires remains in contact with one of the two second insulated electric wires and an other of the two first insulated electric wires remains in contact with an other of the two second insulated electric wires.

3. The composite cable according to claim 1, wherein the first signal wire and the second signal wire, are configured to be connected to a sensor section of an ABS sensor for measuring a rotation speed of a wheel.

4. The composite cable according to claim 1, wherein two or more of the plurality of power supply wires, which are configured to be connected to a other common terminal member, are provided adjacent to each other.

5. The composite cable according to claim 4, wherein the plurality of power supply wires include two power supply wires, which are configured to be connected to an electric parking brake device for braking a rotation of a wheel after vehicle stopping, and wherein the two power supply wires being configured to be connected to the electric parking brake device are provided adjacent to each other.

6. The composite cable according to claim 1,
wherein an internal sheath is provided to cover a whole of the aggregate.

7. A composite harness, comprising:
a composite cable including a plurality of power supply wires, an aggregate comprising a first signal wire comprising two first insulated electric wires and a second signal wire comprising two second insulated electric wires, the first signal wire and the second signal wire being laid together, and a sheath provided to cover the plurality of power supply wires and the aggregate together; and
terminal member provided at end portions of the first signal wire and the second signal wire,
wherein the two first insulated electric wires and the two second insulated electric wires are arranged side-by-side in a circumferential direction of the aggregate,
wherein the two first insulated electric wires are arranged to be adjacent to each other in the circumferential direction of the aggregate and are connected to one of two magnetic detecting elements,
wherein the two second insulated electric wires are arranged to be adjacent to each other in the circumferential direction of the aggregate and are connected to an other of the two magnetic detecting elements,
wherein the composite cable further comprises an internal sheath provided to cover a whole of the aggregate, and
wherein the terminal member comprises a resin mold body, the resin mold body covering an end portion of the internal sheath, the two first insulated electric wires and the two second insulated electric wires being extended out from the end portion of the internal sheath, and the two magnetic detecting elements.

8. A composite cable, comprising:
a plurality of power supply wires;
an aggregate comprising a first signal wire comprising two first insulated electric wires and a second signal wire comprising two second insulated electric wires, the first signal wire and the second signal wire being laid together; and
a sheath provided to cover the plurality of power supply wires and the aggregate together,
wherein the two first insulated electric wires and the two second insulated electric wires are arranged side-by-side in a circumferential direction of the aggregate,
wherein the two first insulated electric wires are connected to one of two magnetic detecting elements, and
wherein the two second insulated electric wires are connected to an other of the two magnetic detecting elements.

9. The composite cable according to claim 8, wherein the two first insulated electric wires are arranged to be adjacent to each other in the circumferential direction of the aggregate, and
wherein the two second insulated electric wires are arranged to be adjacent to each other in the circumferential direction of the aggregate.

10. The composite cable according to claim 8, wherein two or more of the plurality of signal wires connected to the magnetic detecting elements are provided adjacent to each other.

11. The composite cable according to claim 8, wherein the two first insulated electric wires remain in contact with each other and the two second insulated electric wires remain in contact with each other.

12. The composite cable according to claim 8, wherein one of the two first insulated electric wires remains in contact with one of the two second insulated electric wires and an other of the two first insulated electric wires remains in contact with an other of the two second insulated electric wires.

13. The composite cable according to claim 8, wherein the first signal wire and the second signal wire are configured to be connected to a sensor section of an ABS sensor for measuring a rotation speed of a wheel.

14. The composite cable according to claim 8, wherein two or more of the plurality of power supply wires are configured to be connected to a common terminal member, and are provided adjacent to each other.

15. The composite cable according to claim 8, wherein the plurality of power supply wires include two power supply wires, which are configured to be connected to an electric parking brake device for braking a rotation of a wheel after vehicle stopping, and wherein the two power supply wires being configured to be connected to the electric parking brake device are provided adjacent to each other.

16. The composite cable according to claim 8,
wherein an internal sheath is provided to cover a whole of the aggregate.

17. The composite cable according to claim 8,
wherein the two signal wires are provided in such a manner that outer surfaces of the signal wires remain contiguous to each other.

18. The composite cable according to claim 8, further comprising a terminal member provided at end portions of the first and second signal wires, and wherein the terminal member comprises a resin mold body, the resin mold body covering an end portion of the internal sheath, the two first insulated electric wires and the two second insulated electric wires being extended out from the end portion of the internal sheath, and the two magnetic detecting elements.

* * * * *